(12) United States Patent
Wu et al.

(10) Patent No.: US 8,311,693 B2
(45) Date of Patent: Nov. 13, 2012

(54) ENERGY MANAGEMENT FOR HYBRID ELECTRIC VEHICLE DURING TRAILER SWAY

(75) Inventors: Hsien-Cheng (Kevin) Wu, Novi, MI (US); Bo Xu, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 12/950,604

(22) Filed: Nov. 19, 2010

(65) Prior Publication Data
US 2012/0130573 A1   May 24, 2012

(51) Int. Cl.
*B60T 7/12* (2006.01)
(52) U.S. Cl. ............... 701/22; 701/36; 701/45; 701/48; 701/70; 701/71; 701/78; 701/81; 701/83; 303/139; 303/140; 303/144; 303/146; 303/155; 303/157; 303/158; 303/168; 180/14.1; 180/271
(58) Field of Classification Search .................. None
See application file for complete search history.

(56) References Cited

U.S. PATENT DOCUMENTS

| | | | |
|---|---|---|---|
| 3,507,580 A | | 4/1970 | Howard et al. |
| 4,023,863 A | | 5/1977 | Sisson et al. |
| 4,034,822 A | | 7/1977 | Stedman |
| RE30,550 E | * | 3/1981 | Reise ..................... 188/112 A |
| 4,254,998 A | * | 3/1981 | Marshall et al. ............... 303/20 |
| 4,275,898 A | | 6/1981 | Muste Llambrich |
| 5,011,170 A | | 4/1991 | Forbes et al. |
| 5,029,948 A | * | 7/1991 | Breen et al. ........................ 303/7 |
| 5,671,982 A | * | 9/1997 | Wanke .......................... 303/146 |
| 5,707,071 A | | 1/1998 | Prestidge et al. |
| 5,747,683 A | * | 5/1998 | Gerum et al. .............. 73/117.01 |
| 5,799,745 A | * | 9/1998 | Fukatani ........................ 180/410 |
| 5,986,544 A | * | 11/1999 | Kaisers et al. ................. 340/431 |
| 6,012,780 A | * | 1/2000 | Duvernay .......................... 303/7 |
| 6,042,196 A | * | 3/2000 | Nakamura et al. ................ 303/7 |

(Continued)

FOREIGN PATENT DOCUMENTS

DE   19605802   8/1997

(Continued)

OTHER PUBLICATIONS

Robert Bosch Corporation Press Release "Bosch Introduces Trailer Sway Mitigation" dated May 20, 2005.

(Continued)

*Primary Examiner* — Jonathan M Dager
(74) *Attorney, Agent, or Firm* — Michael Best & Friedrich LLP

(57) ABSTRACT

Systems and methods for stabilizing a hybrid electric vehicle ("HEV") towing a trailer. One system includes a regenerative braking system, a non-regenerative braking system, and a stabilization system. The stabilization system determines a direction of rotation and a speed of the HEV and compares the HEV's speed to a predetermined low speed threshold value and a predetermined high speed threshold value. The stabilization system instructs the regenerative braking system to brake at least one wheel when the speed is less than or equal to the predetermined low speed threshold value and instructs the regenerative braking system to brake at least one wheel opposite the direction of rotation and at least one of the regenerative braking system and the non-regenerative braking system to provide an extra stabilizing braking torque to at least one wheel opposite the direction of rotation when the speed is greater than the predetermined high speed threshold value.

17 Claims, 10 Drawing Sheets

U.S. PATENT DOCUMENTS

| | | | |
|---|---|---|---|
| 6,074,020 A * | 6/2000 | Takahashi et al. | 303/146 |
| 6,446,998 B1 | 9/2002 | Koenig et al. | |
| 6,450,019 B1 * | 9/2002 | Wetzel et al. | 73/129 |
| 6,498,977 B2 * | 12/2002 | Wetzel et al. | 701/70 |
| 6,516,260 B2 * | 2/2003 | Wetzel et al. | 701/50 |
| 6,516,925 B1 * | 2/2003 | Napier et al. | 188/112 A |
| 6,522,956 B2 * | 2/2003 | Hecker et al. | 701/1 |
| 6,523,911 B1 * | 2/2003 | Rupp et al. | 303/7 |
| 6,655,710 B2 * | 12/2003 | Lindell et al. | 280/419 |
| 6,668,225 B2 * | 12/2003 | Oh et al. | 701/70 |
| 6,959,970 B2 * | 11/2005 | Tseng | 303/146 |
| 7,226,134 B2 * | 6/2007 | Horn et al. | 303/7 |
| 7,272,481 B2 * | 9/2007 | Einig et al. | 701/70 |
| 7,277,786 B2 | 10/2007 | Stumpp et al. | |
| 7,561,953 B2 * | 7/2009 | Yu | 701/78 |
| 7,917,274 B2 * | 3/2011 | Hackney et al. | 701/82 |
| 8,060,288 B2 * | 11/2011 | Choby | 701/70 |
| 2004/0249547 A1 * | 12/2004 | Nenninger | 701/70 |
| 2005/0006946 A1 | 1/2005 | Traechtler et al. | |
| 2005/0065694 A1 | 3/2005 | Nenninger | |
| 2005/0206229 A1 * | 9/2005 | Lu et al. | 303/123 |
| 2006/0033308 A1 * | 2/2006 | Waldbauer et al. | 280/455.1 |
| 2006/0125313 A1 * | 6/2006 | Gunne et al. | 303/7 |
| 2006/0155457 A1 * | 7/2006 | Waldbauer et al. | 701/72 |
| 2006/0204347 A1 * | 9/2006 | Waldbauer et al. | 410/156 |
| 2006/0229782 A1 * | 10/2006 | Deng et al. | 701/42 |
| 2007/0193795 A1 | 8/2007 | Forsyth | |
| 2007/0205881 A1 | 9/2007 | Breed | |
| 2007/0260385 A1 * | 11/2007 | Tandy et al. | 701/70 |
| 2008/0036296 A1 * | 2/2008 | Wu et al. | 303/146 |
| 2008/0172163 A1 * | 7/2008 | Englert et al. | 701/83 |
| 2009/0005946 A1 * | 1/2009 | Futamura et al. | 701/70 |
| 2009/0093928 A1 * | 4/2009 | Getman et al. | 701/37 |
| 2009/0105906 A1 * | 4/2009 | Hackney et al. | 701/38 |
| 2009/0198425 A1 * | 8/2009 | Englert | 701/70 |
| 2009/0210112 A1 * | 8/2009 | Waldbauer et al. | 701/42 |
| 2009/0228182 A1 * | 9/2009 | Waldbauer et al. | 701/70 |
| 2009/0306861 A1 * | 12/2009 | Schumann et al. | 701/48 |
| 2010/0006362 A1 | 1/2010 | Armstrong | |

FOREIGN PATENT DOCUMENTS

| | | |
|---|---|---|
| EP | 1234739 | 8/2002 |
| EP | 1516792 | 3/2005 |
| FR | 2856362 | 12/2004 |
| GB | 2056388 | 3/1981 |
| GB | 2402453 | 12/2004 |
| JP | 6-335198 | 12/1994 |
| JP | 7-046791 | 2/1995 |
| JP | 2005-132360 | 5/2005 |
| NL | 1030159 | 4/2007 |
| WO | 2004/004103 | 1/2004 |
| WO | 2009/095771 | 8/2009 |

OTHER PUBLICATIONS

PCT/US2011/059041 International Search Report and Written Opinion dated Feb. 3, 2012 (9 pages).

* cited by examiner

ENERGY MANAGEMENT FOR HYBRID ELECTRIC VEHICLE DURING TRAILER SWAY

BACKGROUND

The present invention relates to energy management during trailer sway for a hybrid electric vehicle to maintain fuel efficiency while simultaneously stabilizing the vehicle.

SUMMARY

When a hybrid electric vehicle is towing a trailer, several problems can occur. A first problem includes trailer sway caused by high speed, unfavorable load, side wind, etc. A second problem includes battery depletion due to the heavy load of the trailer. A third problem includes bad fuel efficiency caused by the heavy load. To stabilize trailer sway, most existing vehicle control systems brake one or more wheels of the vehicle, which causes the vehicle to eventually slow down. However, slowing down the vehicle through braking results in lower fuel efficiency, which, as noted above, is already a concern due to the heavy load of the trailer. As a consequence, it is desirable to provide alternative methods and systems for stabilizing trailer sway while still maintaining fuel efficiency.

Therefore, in one construction, the invention provides a system for stabilizing a hybrid electric vehicle having a plurality of wheels and towing a trailer. The system includes a regenerative braking system for braking at least one wheel of the hybrid electric vehicle, a non-regenerative braking system for braking at least one wheel of the hybrid electric vehicle, and a stabilization system coupled to the regenerative braking system and the non-regenerative braking system. The stabilization system determines a direction of rotation and a speed of the hybrid electric vehicle and compares the speed of the hybrid electric vehicle to a predetermined low speed threshold value and a predetermined high speed threshold value. The stabilization system instructs the regenerative braking system to brake at least one wheel included in the hybrid electric vehicle when the speed is less than or equal to the predetermined low speed threshold value and instructs the regenerative braking system to brake at least one wheel included on a side of the hybrid electric vehicle opposite the direction of rotation and the non-regenerative braking system to brake at least one wheel included on a side of the hybrid electric vehicle opposite the direction of rotation when the speed is greater than the predetermined high speed threshold value.

In another construction, the invention provides a method for stabilizing a hybrid electric vehicle towing a trailer. The method includes determining a speed of the hybrid electric vehicle, determining a direction of rotation of the hybrid electric vehicle, and comparing the speed of the hybrid electric vehicle to a predetermined low speed threshold value and a predetermined high speed threshold. The method also includes, when the speed of the hybrid electric vehicle is less than the predetermined low speed threshold value, instructing a regenerative braking system to brake at least one wheel included in the hybrid electric vehicle, and, when the speed of the hybrid electric vehicle is greater than the predetermined high speed threshold value, instructing the regenerative braking system to brake at least one wheel included on a side of the hybrid electric vehicle opposite the direction of rotation and instructing a non-regenerative braking system to brake at least one wheel included on a side of the hybrid electric vehicle opposite the direction of rotation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
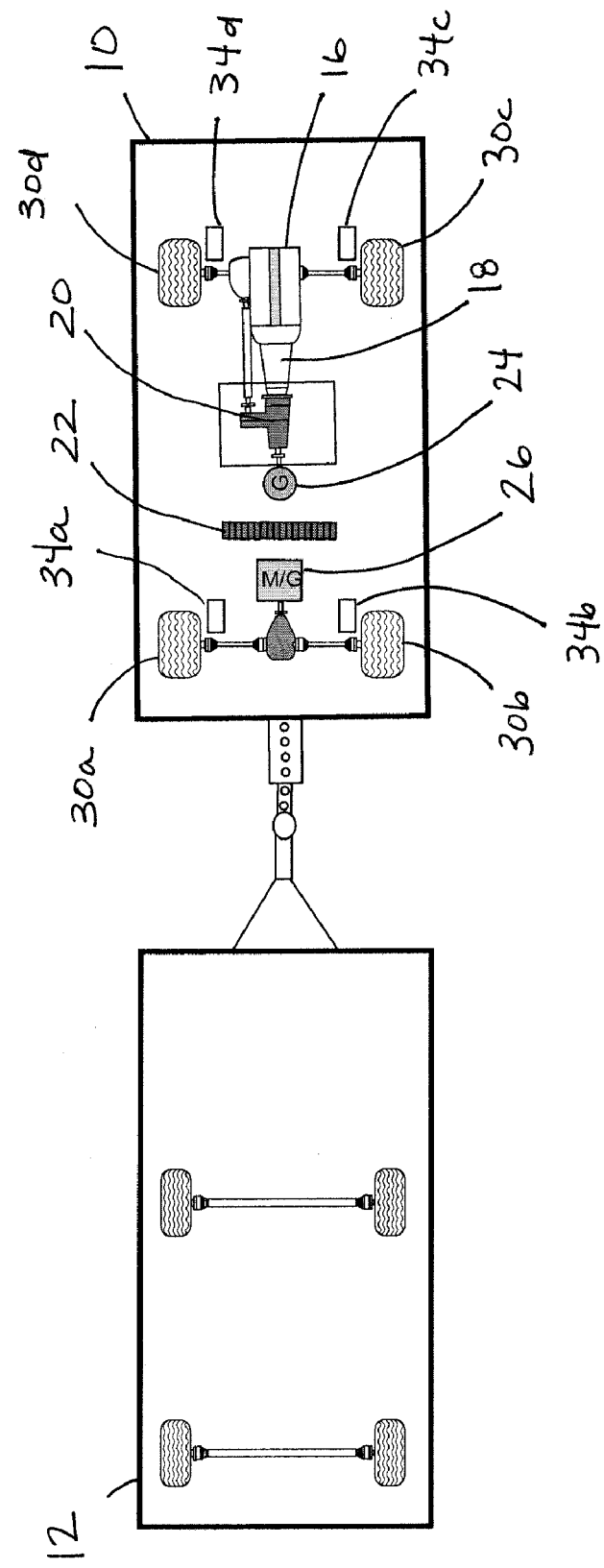
FIG. 1 schematically illustrates a vehicle towing a trailer.

FIG. 1 illustrates a vehicle 10 towing a trailer 12. The vehicle is a hybrid electric vehicle ("HEV"), which includes the combination of a conventional internal combustion engine propulsion system and an electric propulsion system. HEVs are designed to provide fuel efficiency. Some HEVs include additional efficiency-improving technologies, such as regenerative braking. Regenerative braking converts the vehicle's kinetic energy generated during wheel braking into battery-replenishing electric energy (e.g., rather than wasting it as heat energy). Some HEVs also use their internal combustion engine to generate electricity by spinning an electrical generator. The combination of the internal combustion engine and the electrical generator is often called a motor/generator or motor-generator. The generated electricity is used to recharge the vehicle's batteries, power electric drive motors included in the vehicle, or combinations thereof. Motor/generators can also perform regenerative braking.

As shown in FIG. 1, the vehicle 10 includes an engine 16, a transmission 18, a controllable, four-wheel drive coupling device 20, a battery 22, a generator 24, and a motor/generator 26. The generator 24 is driven by the engine 16 to generate electricity to recharge the battery 22. The drive motor/generator 26 regeneratively brakes the vehicle's back wheels 30a and 30b and drives the vehicle's back wheels 30a and 30b. Therefore, the drive motor/generator 26 acts as a driving system and a regenerative braking system for the back wheels 30a and 30b. The vehicle 10 also includes front wheels 30c and 30d.

The vehicle 10 also includes non-regenerative braking system 34. The non-regenerative braking system 34 includes one or more non-regenerative brakes, such as a hydraulic disc brake. As shown in FIG. 1, in some embodiments, each wheel 30a, 30b, 30c, and 30d includes a non-regenerative brake 34a, 34b, 34c, and 34d. It should be understood that in some embodiments only certain wheels of the vehicle may include a non-regenerative brake. The brakes 34 are removed from further figures of vehicle 10 for simplification purposes.

When the vehicle 10 tows the trailer 12, trailer sway 12 creates oscillation energy that makes the trailer 12 and, subsequently, the vehicle 10 unstable. Furthermore, a vehicle-trailer combination creates a heavy load condition that quickly depletes the vehicle's battery 22. Based on these situations, the vehicle 10 also includes a stabilization system 40 (see FIG. 2) that harvests the trailer oscillation energy and stabilizes trailer sway. The stabilization system 40 creates a torque that counteracts the torque of the trailer sway. The torque created by the stabilization system 40 is distributed among regenerative braking, driving (e.g., using a battery-powered motor), and extra stabilizing braking (e.g., regenerative braking and/or non-regenerative braking). Non-regenerative braking can be applied by an electronic stability control module 42 (see FIG. 2) using the non-regenerative braking system 34.

In general, the stabilization system 40 distributes the counteracting torque among the three forces in various combinations depending on the state and configuration of the vehicle. For example, the stabilization system 40 divides trailer sway into three categories. In the first category, a vehicle is traveling at a speed less than or equal to a predetermined low speed threshold value (e.g., a speed where resulting trailer oscillation is not damped). In this situation, the trailer oscillation is small and relatively harmless. Therefore, the counteracting torque only includes a regenerative braking force applied to one or more of the vehicle's wheels, which also allows the vehicle's battery 22 to be charged at the same time the vehicle is being stabilized. Since small oscillation happens often during vehicle-trailer driving conditions, the battery 22 can use the energy created during the regenerative braking to remain charged.

In the second situation, a vehicle is traveling at a speed greater than the low speed threshold value. In this situation, the trailer oscillation can be damped in different ways depending on the configuration of the vehicle. For example, the wheels on one side of the vehicle can be braked to provide an extra stabilizing braking (e.g., non-regeneratively braked and/or regeneratively braked) and the wheels on the opposite side of the vehicle can just be regeneratively braked. This combination of braking creates the needed torque to counter the trailer oscillation that is created when the vehicle is traveling at a speed greater than the low speed threshold value while still allowing the battery to be charged.

In the third situation, a vehicle is traveling at a speed greater than a predetermined high speed threshold value. Again, the trailer oscillation can be damped in different ways depending on the configuration of the vehicle. For example, in addition to regeneratively braking and non-regeneratively braking particular wheels (e.g., to provide extra stabilizing braking), a drive torque is added to at least one in the vehicle. This combination of forces creates enough torque to counteract the trailer sway while still minimizing battery usage and simultaneously allowing for battery charging. It should be understood that the low speed threshold value and the high speed threshold value can be implemented as a single threshold value. For example, the single threshold value can operate as the low speed threshold and the high speed threshold can be obtained by determining whether the vehicle's speed is greater than the single threshold by a predetermined amount.

The low and high speed thresholds are set based on the configuration of the vehicle and the configuration and load of the trailer towed by the vehicle. For example, the thresholds can be set based on the weight of the vehicle, the wheel base of the vehicle (i.e., the distance between the vehicle's front axle and rear axle), or combinations thereof. In general, the more the vehicle weighs and the larger the vehicle, the more trailer sway may be generated and the thresholds for the vehicle may be set lower than a vehicle with a lower weight, lower wheel base, or both. Similarly, the thresholds can be set based on the loading of the trailer. Depending on how a load in the trailer is loaded, a downward force may be generated on the hitch or connection between the trailer and the vehicle, which can be transferred to the vehicle. In abnormal loading situations, the downward force generated by the trailer may be greater than normal, which may be approximately 10% of the weight of the load. In these situations, the threshold values may be set lower than if the load was loaded normally or adequately. For example, in normal loading situations, the low speed threshold value may be set to approximately 110 to 125 kilometers per hour, and in abnormal loading situations, the low speed threshold value may be set to approximately 55 kilometers per hour. Similarly, the high speed threshold value may be set to approximately 10 kilometers per hour more than the low speed threshold. Again, these values are examples and different threshold values can be used based on the configuration of the vehicle, the trailer, and the environment in which the vehicle and trailer are traveling.

Figure 2:
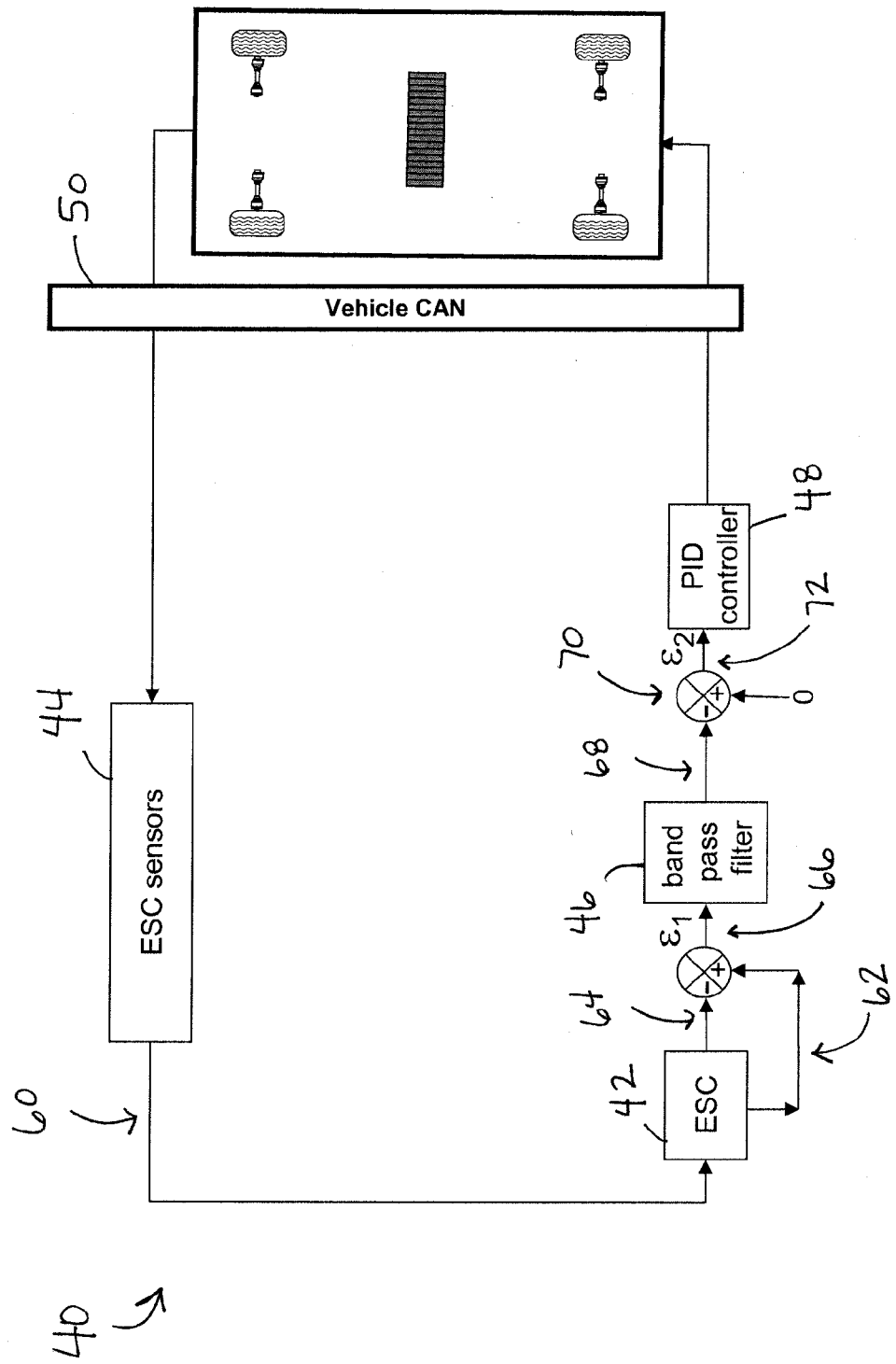
FIG. 2 schematically illustrates a control system for the vehicle of FIG. 1 including a stabilization system.

FIG. 2 schematically illustrates the stabilization system 40. The stabilization system 40 includes an electronic stability control ("ESC") module 42. The ESC module 42 includes software stored on one or more non-transitory computer-readable mediums, such as read-only memory ("ROM"), random access memory ("RAM"), optical disk drive, etc. One or more processors included in the stabilization system 40 and/or the ESC module 42 execute the software to stabilize a vehicle, as described in more detail below. In some embodiments, the ESC module 42 controls the non-regenerative braking system 34 to stabilize the vehicle.

The stabilization system 40 also includes one or more ESC sensors 44, such as a wheel speed sensor, a yaw rate sensor, a lateral sensor, a steering angle sensor, and a pressure sensor. As shown in FIG. 2, the stabilization system 40 also includes a band pass filter 46, and a proportional-integral-derivative ("PID") controller 48. In some embodiments, the ESC 42, sensors 44, band pass filter 46, and PID controller 48 communicate using a vehicle controller area network ("CAN") 50. For example, as shown in FIG. 2, a motor/generator can receive control signals over the vehicle CAN 50 that direct the motor/generator to operate a wheel in a particular manner.

The stabilization system 40 receives information from the ESC sensors 44 representing various sensor measurements (at step 60), which is provided to the ESC module 42. The sensor measurements can include a wheel speed sensor measurement, a yaw rate sensor measurement, a lateral acceleration sensor measurement, a steering angle sensor measurement, and a pressure sensor measurement. The ESC module 42 uses the received information to determine whether the vehicle 10 needs to be stabilized. For example, as shown in FIG. 2, the ESC module 42 determines a filtered yaw rate from the received information (at step 62) and compares the filtered yaw rate to a target yaw rate (at step 64). The difference between these two values establishes a yaw rate error between a driver intended yaw rate and the yaw sensor measurement (i.e., $\epsilon_1$) (at step 66). The yaw rate error is then passed to the band pass filter 46, which generates a second order band-pass filter output based on the yaw rate error (at step 68). The filtered yaw rate error is then compared to a predetermined value (e.g., 0) (at step 70). The result of the comparison represents a controller signal to the vehicle's drive system for returning the vehicle 10 to a driver-intended or steady state (i.e., $\epsilon_2$) (at step 72). In some situations, the controller signal is asymmetric, which means that one or more of the wheels of the vehicle are operated differently than the other wheel(s).

As shown in FIG. 2, the controller signal is provided to the PID controller 48. The PID controller 48 uses the controller signal to determine a continuous asymmetric torque side-by-side distribution (at step 74). For example, the PID controller 48 determines a regenerative braking torque to be applied by a motor/generator associated with one or more wheels (i.e., $M_{BBatt}$), a driving torque to be applied by a motor/generator associated with one or more wheels (i.e., $M_{DBatt}$), and a braking torque generated by a non-regenerative braking system, such as a ESC hydraulic disk brakes (i.e., $M_{ESC}$). The sum of these torques represent the torque distribution (i.e., $M_{soDiffTOL}$). The PID controller 48 outputs the distribution over the vehicle CAN 50 to the motor/generators and the non-regenerative braking system associated with the distribution. The particular torque distribution determined by the PID controller 48 can vary. In particular, the torque distribution is varied based on the speed of the vehicle and the steering angle of the vehicle. The torque distribution is also varied based on the configuration of the vehicle. Therefore, as described below in more detail, it should be understood that the stabilization system 40 can be used with different vehicle drive-train configurations. For example, although a four-wheel-drive configuration is the vehicle 10 illustrated in FIGS. 1 and 2, the stabilization system 40 can also be used with a rear-wheel drive configuration and a front-wheel drive configuration.

Figure 3:
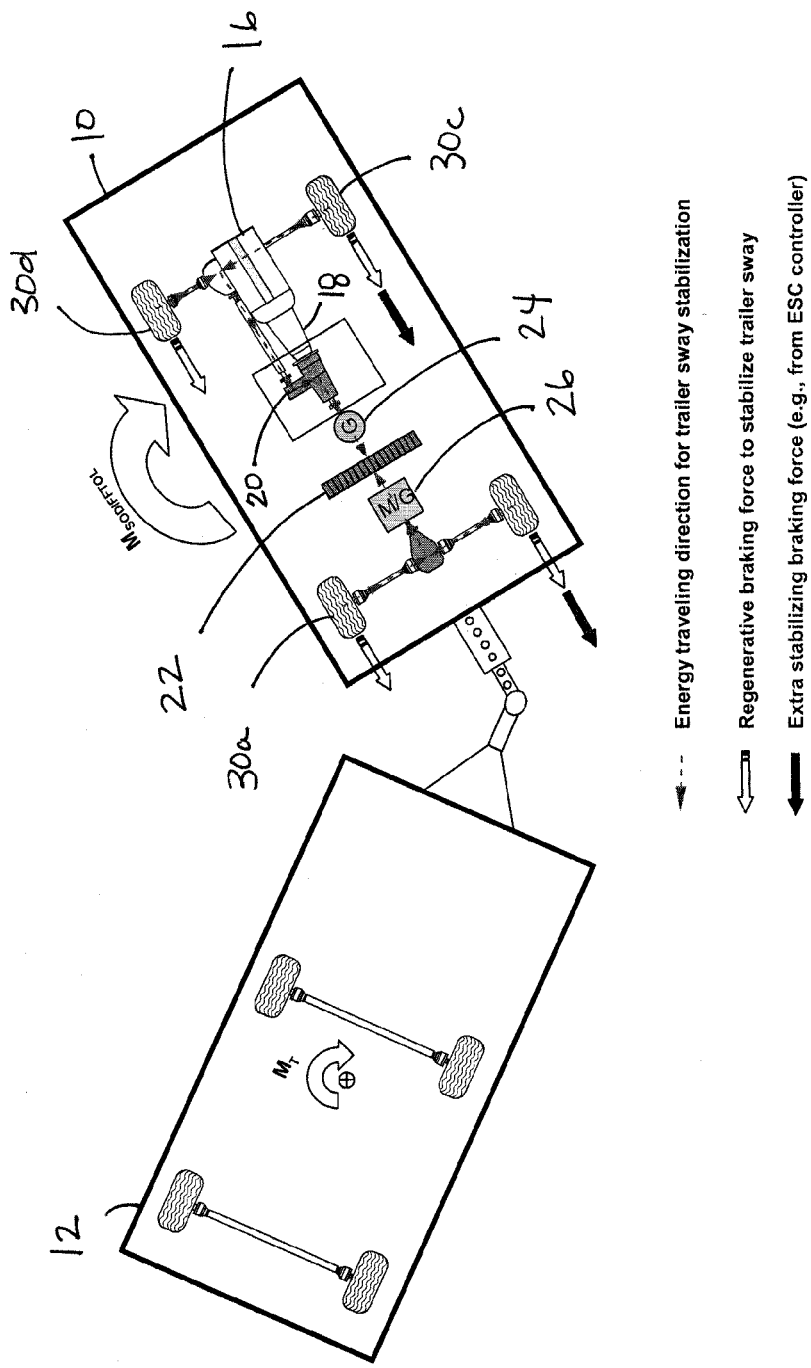
FIG. 3 schematically illustrates a stabilization method performed by the stabilization system of FIG. 2 to correct trailer sway when the vehicle of FIG. 1 is rotating counterclockwise and traveling at a speed greater than a low speed threshold value.

FIG. 3 schematically illustrates the vehicle 10 rotating counterclockwise. It should be understood that throughout this document rotational descriptions of "clockwise" and "counterclockwise" and directional descriptions of "right," "left," "front," and "back" are described from the perspective of a driver located within a vehicle.

The stabilization system 40 performs various steps to stabilize the vehicle 10 and counteract the sway of the trailer 12 caused by the vehicle's rotation. As described above with respect to FIG. 2, the stabilization system 40 determines whether stabilization is needed and, if so, determines the torque distribution for performing stabilization. As previously noted, the torque distribution includes three possible torques that can be generated to counteract the torque generated by the trailer sway (i.e., $M_T$). In general, the three possible torques are determined based on the vehicle's direction of rotation and speed and the vehicle's configuration. Therefore, as described above, the stabilization system 40 determines the vehicle's speed (e.g., based on a wheel speed sensor measurement, a yaw rate sensor measurement, a lateral acceleration sensor measurement, a steering angle sensor measurement, a pressure sensor measurement, or combinations thereof) and the vehicle's direction of rotation (e.g., based on a wheel speed sensor measurement, a yaw rate sensor measurement, a lateral acceleration sensor measurement, a steering angle sensor measurement, a pressure sensor measurement, or combinations thereof), and uses this information to determine how to stabilize the trailer sway.

For example, if the vehicle 10 is rotating counterclockwise (or left) but is traveling at a speed less or equal to a predetermined low speed threshold value (e.g., approximately 110 to 125 kilometers per hour or approximately 55 kilometers per hour if the trailer is loaded improperly), the stabilization system 40 generates a torque distribution that includes a regenerative braking torque created by regeneratively-braking each of the vehicle's four wheels 30a, 30b, 30c, and 30d. The regenerative braking generates energy at each wheel that is directed to the battery 22. Therefore, the vehicle 10 is stabilized and the battery 22 is charged, which aids fuel efficiency.

If, however, the vehicle 10 is rotating counterclockwise but is traveling at a speed greater than the low speed threshold speed, the stabilization system 40 generates a torque distribution that includes a regenerative braking torque and an extra stabilizing braking torque. As shown in FIG. 3, in this situation, the regenerative braking torque is generated by regeneratively braking each of the four wheels 30a, 30b, 30c, and 30d, and the extra stabilizing braking torque is generated by providing an additional stabilizing braking force to the wheels 30b and 30c on the right side of the vehicle 10 (i.e., the wheels opposite the direction of rotation). If the capacity of the motor/generator 26 is not saturated, the additional stabilizing braking force (or a portion thereof) can be performed by the motor/generator 26. However, if the capacity of the motor/generator 26 is saturated, the additional stabilizing braking force (or a portion thereof) can be performed by a non-regenerative braking system, such as hydraulic braking units 34b and 34c controlled by the ESC module 42. The asymmetric braking helps stabilize the vehicle 10 and counteract the clockwise sway of the trailer 12. Again, the torque distribution stabilizes the vehicle 10, and, because each of the wheels is still being regeneratively braked, energy from each wheel is also charging the battery 22.

In addition, if the vehicle is traveling at a speed greater than a predetermined high speed threshold value (e.g., approximately 10 kilometers per hour more than the low speed threshold value), the torque distribution includes a regenerative braking torque and an extra stabilizing braking torque similar to the situation illustrated in FIG. 3. However, the regenerative braking torque is generated by regeneratively braking only the wheels 30b and 30c on the right side of the vehicle 10 (i.e., the wheels opposite the direction of rotation). Therefore, the wheels 30b and 30c are each braked, while the other two wheels 30a and 30d are not braked at all. This disparate braking of the wheels counteracts the clockwise sway of the trailer 12 when the vehicle 10 is traveling at high speeds and rotating counterclockwise. Since some of the wheels are still be regeneratively braked, the battery 22 is still charged in this situation.

Figure 4:
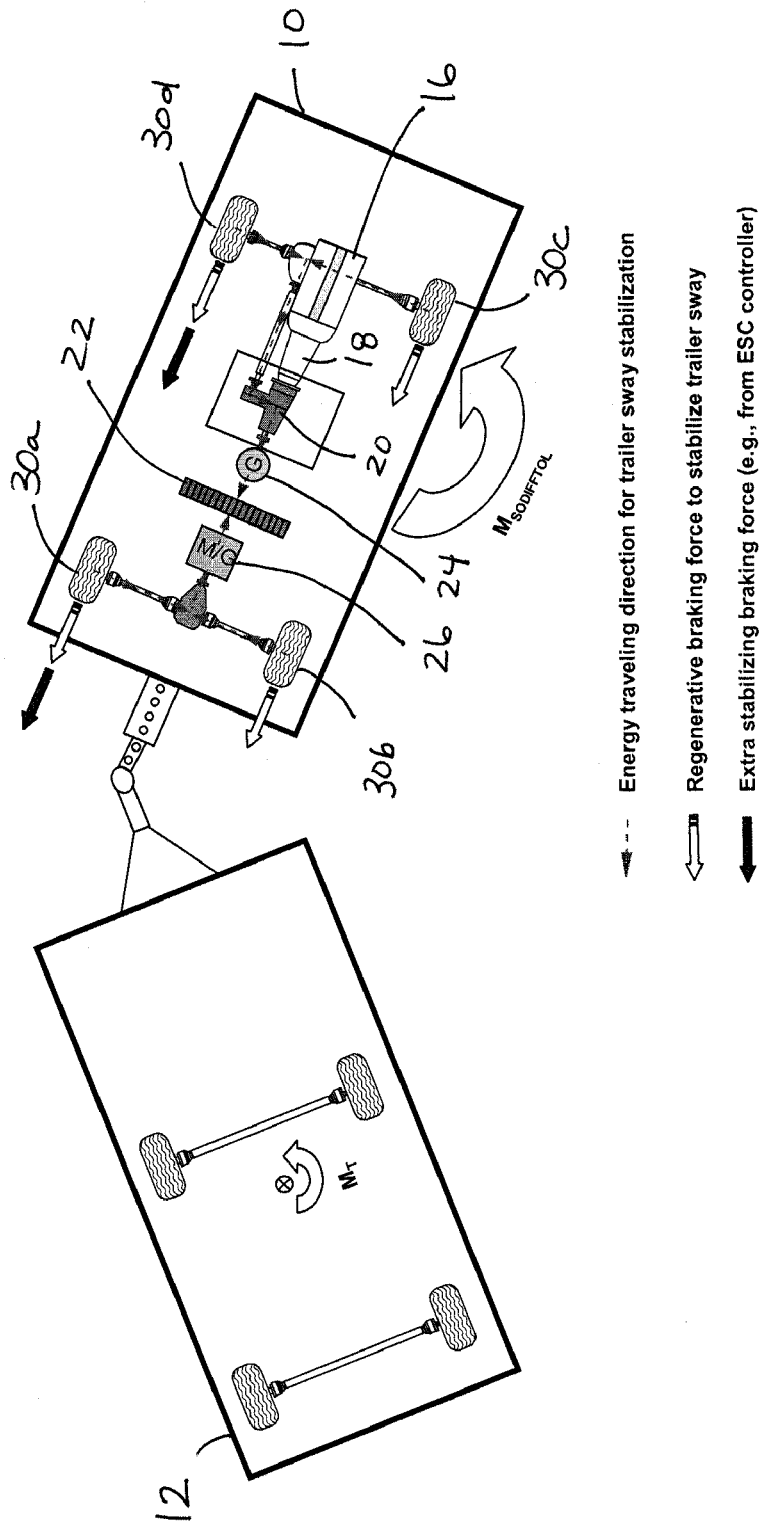
FIG. 4 schematically illustrates a stabilization method performed by the stabilization system of FIG. 2 to correct trailer sway when the vehicle of FIG. 1 is rotating clockwise and traveling at a speed greater than a low speed threshold value.

Similarly, FIG. 4 schematically illustrates the vehicle 10 rotating clockwise (or right). In this situation, if the vehicle 10 is traveling at a speed less than or equal to the low speed threshold value, the torque distribution includes a regenerative braking torque created by regeneratively-braking each of the vehicle's four wheels 30a, 30b, 30c, and 30d. If, however, the vehicle 10 is traveling at a speed greater than the low speed threshold value, the torque distribution includes a regenerative braking torque and an extra stabilizing braking torque. As shown in FIG. 4, in this situation, the regenerative braking torque is generated by regeneratively braking each of the four wheels 30a, 30b, 30c, and 30d. If the capacity of the motor/generator 26 is not saturated, the extra stabilizing braking torque (or a portion thereof) is generated by the motor/generator 26. If the capacity of the motor/generator 26 is saturated, the extra stabilizing braking torque (or a portion thereof) is generated by providing an additional stabilizing braking force to the wheels 30a and 30d on the left side of the vehicle 10 (i.e., the wheels opposite the direction of rotation) using the non-regenerative brakes 34a and 34d. In addition, if the vehicle 10 is traveling at a speed greater than the high speed threshold value, the torque distribution includes a regenerative braking torque and an extra stabilizing braking torque similar to the situation illustrated in FIG. 4. However, the regenerative braking torque is generated by regeneratively braking only the wheels 30a and 30d on the left side of the vehicle 10 (i.e., the wheels opposite the direction of rotation). Therefore, the wheels 30a and 30d are each braked, while the other two wheels 30b and 30c are not braked at all.

Figure 5:
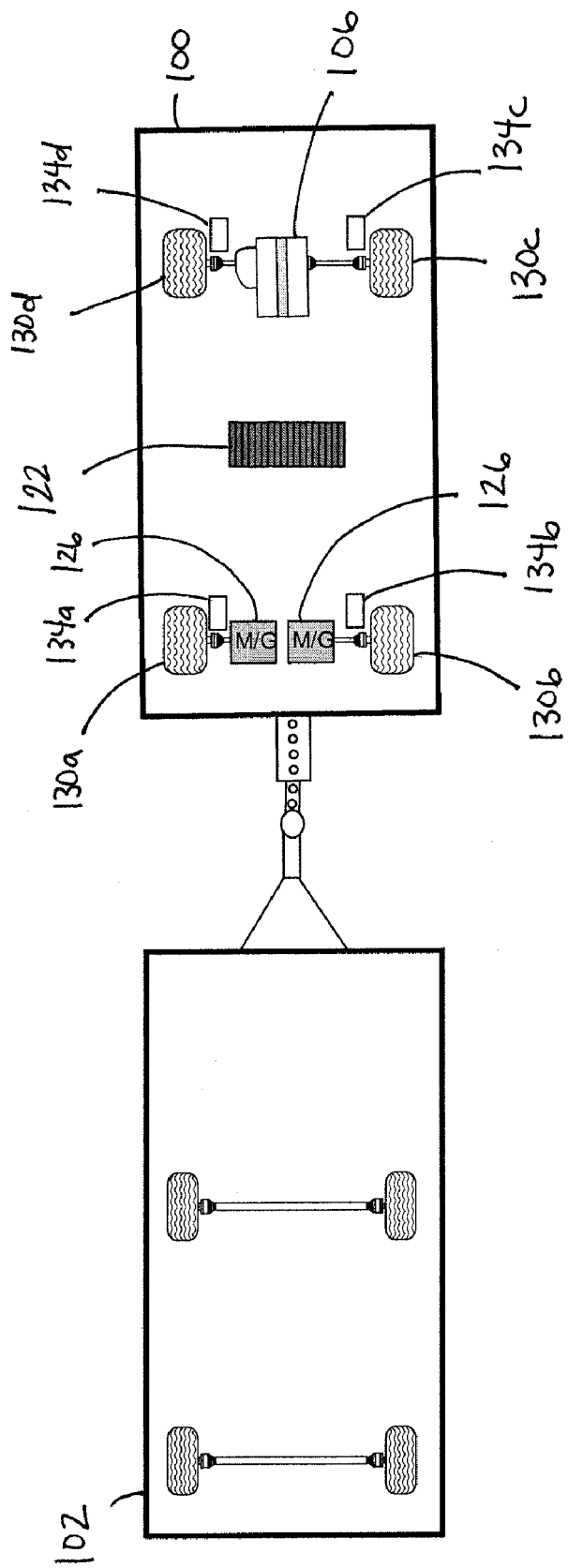
FIG. 5 schematically illustrates another vehicle towing a trailer.

FIG. 5 schematically illustrates another vehicle 100 towing a trailer 102. Similar to the vehicle 10, the vehicle 100 includes an engine 106, a battery 122, motor/generators 126, wheels 130a, 130b, 130c, and 130d, and non-regenerative brakes 134a, 134b, 134c, and 134d. The brakes are removed from further figures of vehicle 100 for simplification purposes. The vehicle 100 also includes the stabilization system 40 described above with respect to FIG. 2. However, because the vehicle 100 includes a motor/generator 126 for each of the two back wheels 30a and 30b, the torque distributions determined by the stabilization system 40 are different than for the vehicle 10 illustrated above in FIGS. 1-4.

Figure 6:
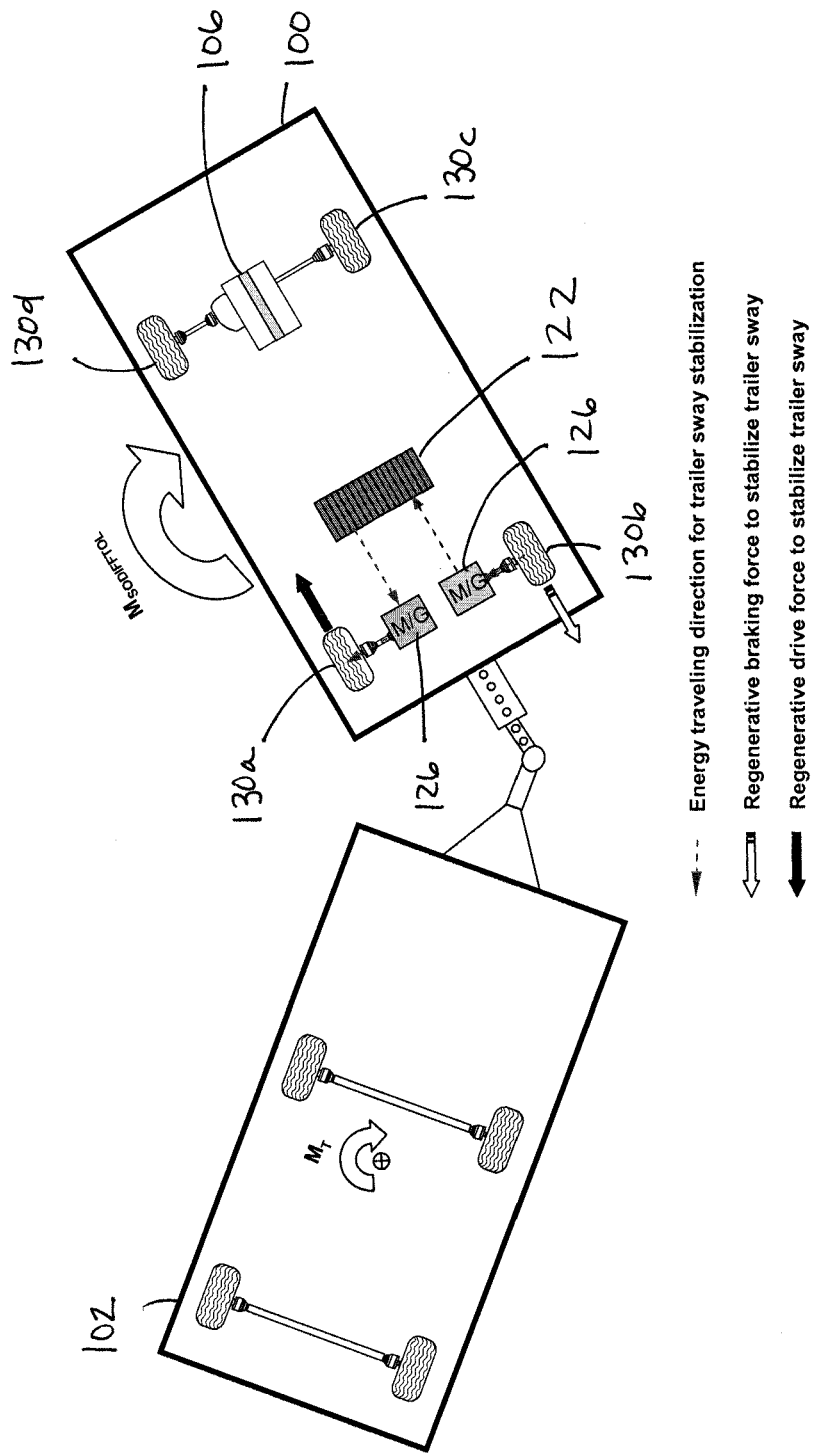
FIG. 6 schematically illustrates a stabilization method performed by the stabilization system of FIG. 2 to correct trailer sway when the vehicle of FIG. 5 is rotating counterclockwise and traveling at a speed greater than a low speed threshold value.

FIG. 6 schematically illustrates the vehicle 100 rotating counterclockwise (or left). In this situation, if the vehicle 100 is traveling at a speed less than or equal to a predetermined low speed threshold value (e.g., approximately 110 to 125 kilometers per hour or approximately 55 kilometers per hour if the trailer is loaded improperly), the torque distribution includes a regenerative braking torque created by regeneratively-braking only the back right wheel 130b (i.e., the back wheel opposite the direction of rotation). If, however, the vehicle 100 is traveling at a speed greater than the low speed threshold value, the torque distribution includes a regenerative braking torque and a driving torque. As shown in FIG. 6, in this situation, the regenerative braking torque is generated by regeneratively braking the back right wheel 130b, and the driving torque is generated by driving the back left wheel 130a (i.e., the back wheel corresponding to the direction of rotation). Therefore, because the back wheels 130a and 130b can be individually driven and braked due to the separate motor/generators 126, the back right wheel 130b can be braked while the back left wheel 130a is driven (e.g., its speed is increased).

In addition, if the vehicle 100 is traveling at a speed greater than a predetermined high speed threshold value (e.g., approximately 10 kilometers per hour more than the low speed threshold value), the torque distribution includes a regenerative braking torque and a driving torque similar to the situation illustrated in FIG. 6. However, the torque distribution also includes an extra stabilizing braking torque that applies an additional braking force to the back right wheel 130b (i.e., the back wheel opposite the direction of rotation). If the capacity of the motor/generator 126 for the back right wheel 130b is not saturated, the extra stabilizing braking torque (or a portion thereof) is generated by the motor/generator 126 for the back right wheel 130b. However, if the capacity of the motor/generator 126 for the back right wheel 130b is saturated, the extra stabilizing braking torque (or a portion thereof) is generated by providing an additional stabilizing braking force to the wheel 130b using the non-regenerative brake 134b.

Figure 7:
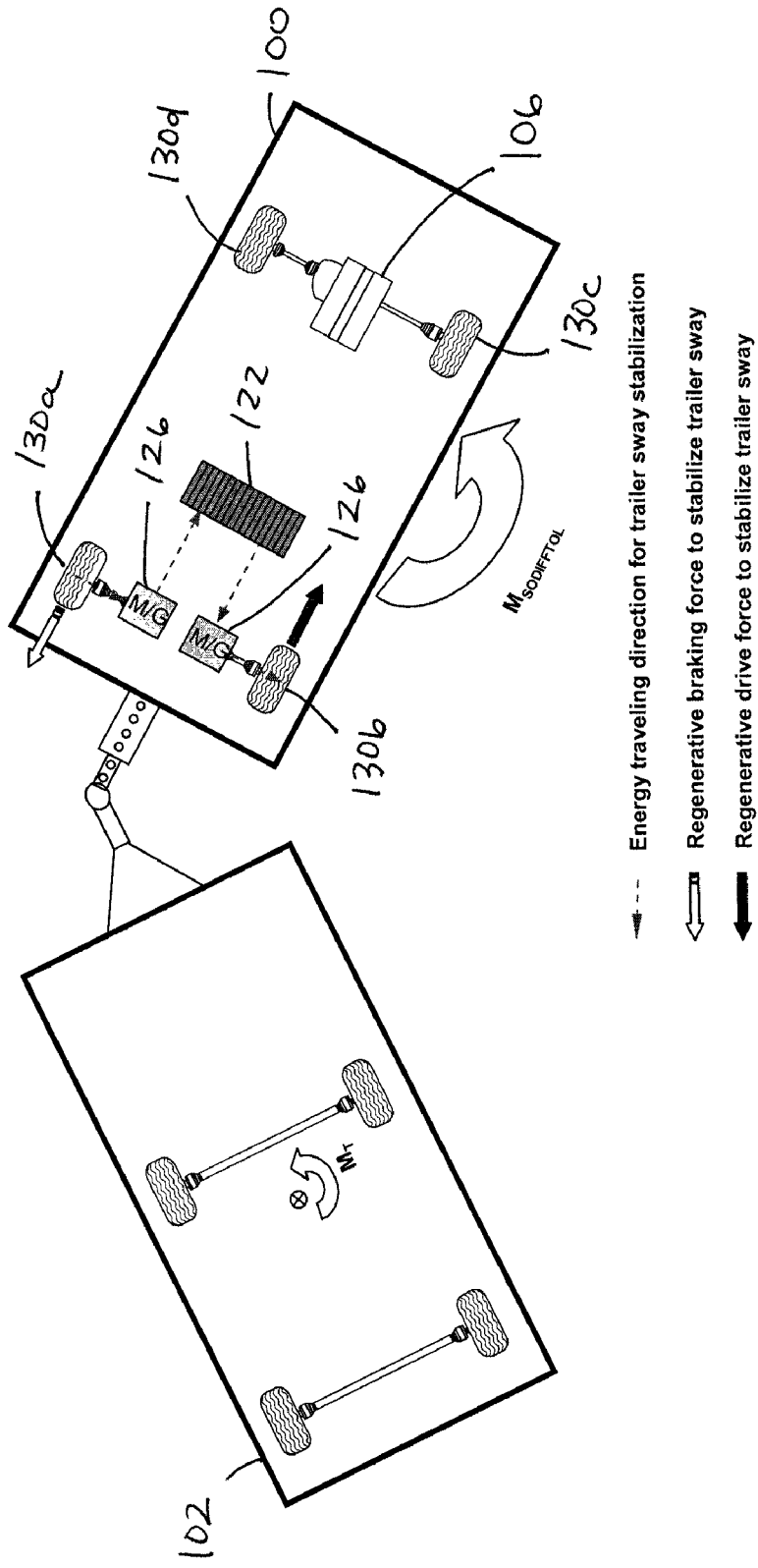
FIG. 7 schematically illustrates a stabilization method performed by the stabilization system of FIG. 2 to correct trailer sway when the vehicle of FIG. 5 is rotating clockwise and traveling at a speed greater than a low speed threshold value.

Similarly, FIG. 7 schematically illustrates the vehicle 100 rotating clockwise (or right). In this situation, if the vehicle 100 is traveling at a speed less than or equal to the low speed threshold value, the torque distribution includes a regenerative braking torque created by regeneratively-braking only the back left wheel 130a (i.e., the back wheel opposite the direction of rotation). If, however, the vehicle 100 is traveling at a speed greater than the low speed threshold value, the torque distribution includes a regenerative braking torque and a driving torque. As shown in FIG. 7, in this situation, the regenerative braking torque is generated by regeneratively braking the back left wheel 130a, and the driving torque is generated by driving the back right wheel 130b (i.e., the back wheel corresponding to the direction of rotation). Therefore, because the back wheels 130a and 130b can be individually driven and braked due to the separate motor/generators 126, the back left wheel 130a can be braked while the back right wheel 130b is driven (e.g., its speed is increased).

In addition, if the vehicle 100 is traveling at a speed greater than the predetermined high speed threshold value, the torque distribution includes a regenerative braking torque and a driving torque similar to the situation illustrated in FIG. 7. However, the torque distribution also includes an extra stabilizing braking torque that applies an additional braking force to the back left wheel 130a (i.e., the back wheel opposite the direction of rotation). If the capacity of the motor/generator 126 for the back left wheel 130a is not saturated, the extra stabilizing braking torque (or a portion thereof) is generated by the motor/generator 126 for the back left wheel 130a. However, if the capacity of the motor/generator 126 for the back left wheel 130a is saturated, the extra stabilizing braking torque (or a portion thereof) is generated by providing an additional stabilizing braking force to the wheel 130a using the non-regenerative brake 134a.

Figure 8:
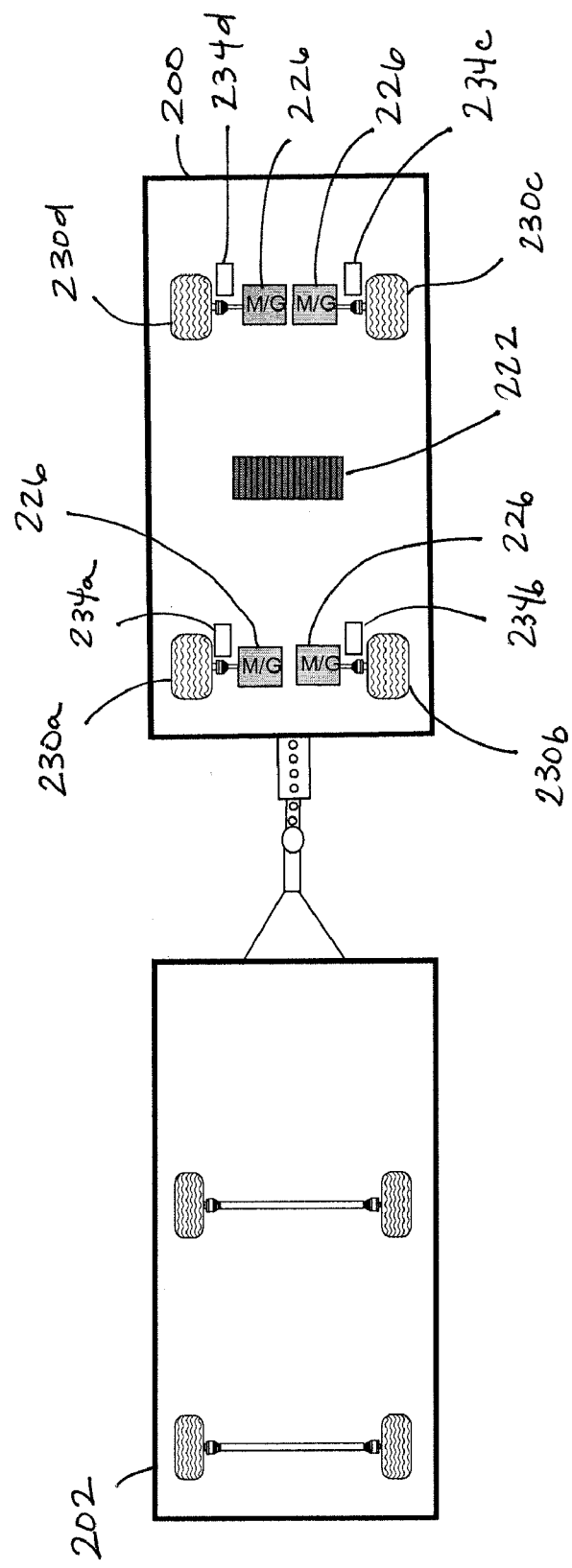
FIG. 8 schematically illustrates another vehicle towing a trailer.

FIG. 8 schematically illustrates another vehicle 200 towing a trailer 202. Similar to the vehicles 10 and 100, the vehicle 200 includes a battery 222, motor/generators 226, wheels 230a, 230b, 230c, and 230d, and non-regenerative brakes 234a, 234b, 234c, and 234d. As previous done, the non-regenerative brakes are removed from further figures of vehicle 200 for simplification purposes. The vehicle 200 also includes the stabilization system 40 described above with respect to FIG. 2. However, because the vehicle 200 includes a motor/generator 226 for each wheel, the torque distributions determined by the stabilization system 40 are different than for the vehicle 10 illustrated above in FIGS. 1-4 and the vehicle 100 illustrated above in FIGS. 5-7.

Figure 9:
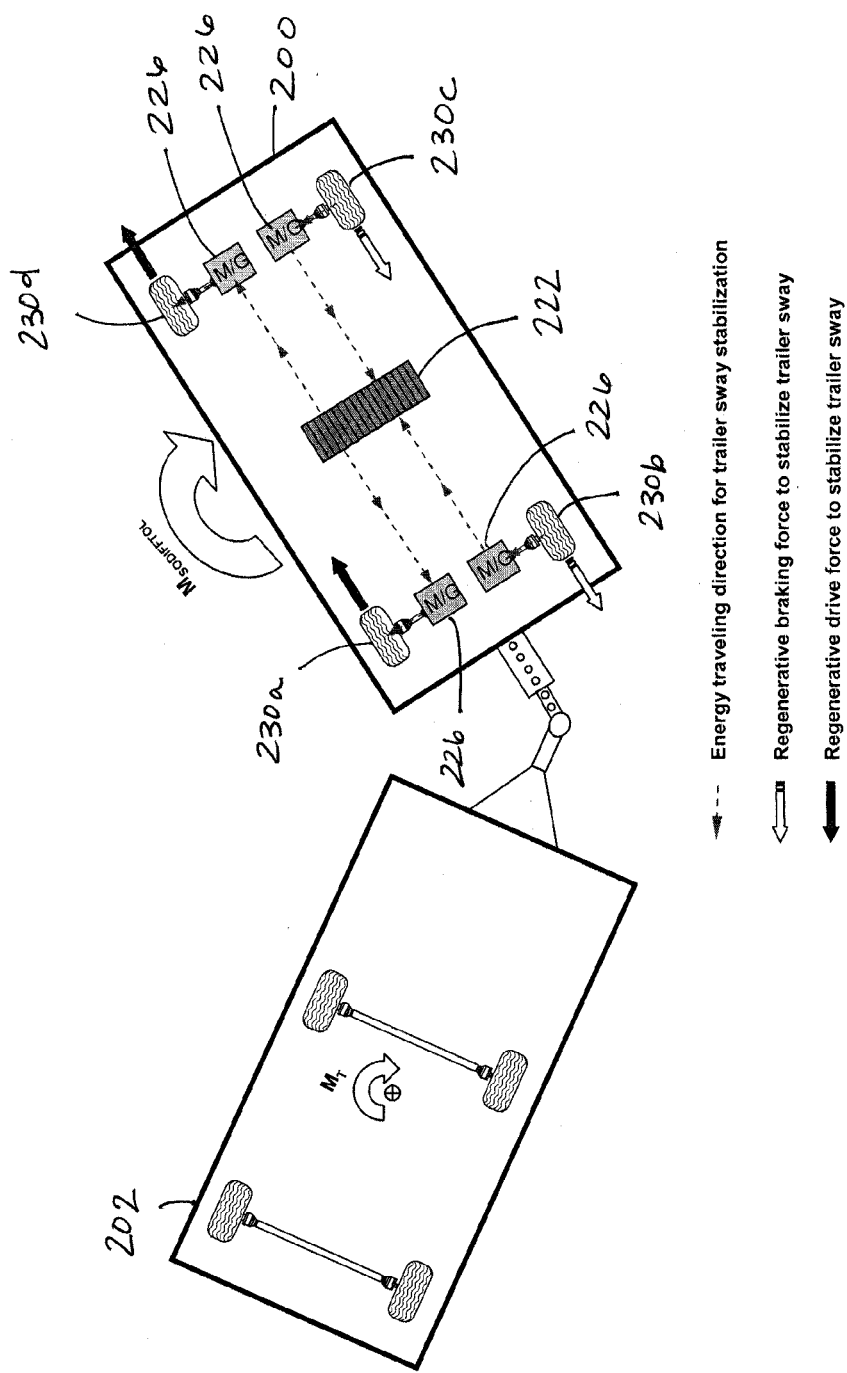
FIG. 9 schematically illustrates a stabilization method performed by the stabilization system of FIG. 2 to correct trailer sway when the vehicle of FIG. 8 is rotating counterclockwise and traveling at a speed greater than a low speed threshold value.

FIG. 9 schematically illustrates the vehicle 200 rotating counterclockwise (or left). In this situation, if the vehicle 200 is traveling at a speed less than or equal to a predetermined low speed threshold value (e.g., approximately 110 to 125 kilometers per hour or approximately 55 kilometers per hour if the trailer is loaded improperly), the torque distribution includes a regenerative braking torque created by regeneratively-braking only the right wheels 230b and 230c. If, however, the vehicle 200 is traveling at a speed greater than the low speed threshold value, the torque distribution includes a regenerative braking torque and a driving torque. As shown in FIG. 9, in this situation, the regenerative braking torque is generated by regeneratively braking the right wheels 230b and 230c (i.e., the wheels opposite the direction of rotation), and the driving torque is generated by driving the left wheels 230a and 230d (i.e., the wheels corresponding to the direction of rotation). Therefore, because each wheel can be individually driven and braked due to the separate motor/generators 226, the right wheels 230b and 230c can be braked while the left wheels 230a and 230d are driven (e.g., their speed is increased).

In addition, if the vehicle 200 is traveling at a speed greater than a predetermined high speed threshold value (e.g., approximately 10 kilometers per hour more than the low speed threshold value), the torque distribution includes a regenerative braking torque and a driving torque similar to the situation illustrated in FIG. 9. However, the torque distribution also includes an extra stabilizing braking torque that applies an additional braking force to the right wheels 230b and 230c (i.e., the wheels opposite the direction of rotation). If the capacity of the motor/generators 226 for the right wheel 230b and/or the right wheel 230c is not saturated, the extra stabilizing braking torque (or a portion thereof) is generated by the motor/generators 226 for the rights wheels 230b and/or 230c. However, if the capacity of the motor/generators 226 for the right wheel 230b and/or the right wheel 230c is saturated, the extra stabilizing braking torque (or a portion thereof) is generated by providing an additional stabilizing braking force to the wheels 230b and/or 230c using the non-regenerative brakes 234b and 234c.

Figure 10:
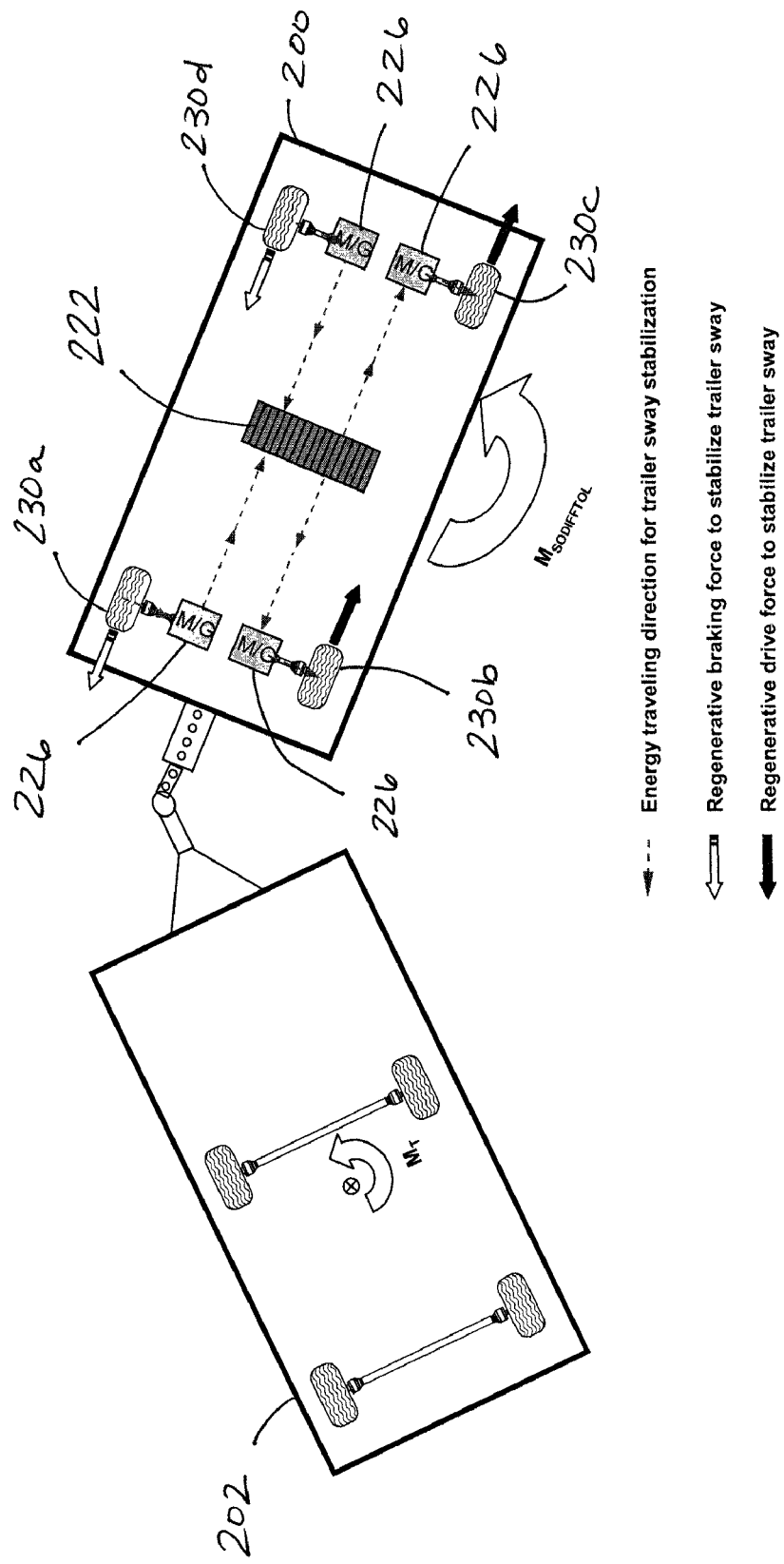
FIG. 10 schematically illustrates a stabilization method performed by the stabilization system of FIG. 2 to correct trailer sway when the vehicle of FIG. 8 is rotating clockwise and traveling at a speed greater than a low speed threshold value.

Similarly, FIG. 10 schematically illustrates the vehicle 200 rotating clockwise (or right). In this situation, if the vehicle 200 is traveling at a speed less than or equal to the low speed threshold value, the torque distribution includes a regenerative braking torque created by regeneratively-braking only the left wheels 230a and 230d (i.e., the wheels opposite the direction of rotation). If, however, the vehicle 200 is traveling at a speed greater than the low speed threshold value, the torque distribution includes a regenerative braking torque and a driving torque. As shown in FIG. 10, in this situation, the regenerative braking torque is generated by regeneratively braking the left wheels 230a and 230d, and the driving torque is generated by driving the right wheels 230b and 230c (i.e., the wheels corresponding to the direction of rotation). Therefore, because each wheel can be individually driven and braked due to the separate motor/generators 226, the left wheels 230a and 230d can be braked while the right wheels 230b and 230d are driven (e.g., their speed is increased).

In addition, if the vehicle 200 is traveling at a speed greater than the high speed threshold value, the torque distribution includes a regenerative braking torque and a driving torque similar to the situation illustrated in FIG. 10. However, the torque distribution also includes an extra stabilizing braking torque that applies an additional braking force to the left wheels 230a and 230d (i.e., the wheels opposite the direction of rotation). If the capacity of the motor/generators 226 for the left wheel 230a and/or the left wheel 230d is not saturated, the extra stabilizing braking torque (or a portion thereof) is generated by the motor/generators 226 for the left wheels 230a and/or 230d. However, if the capacity of the motor/generators 226 for the left wheel 230a and/or the left wheel 230d is saturated, the extra stabilizing braking torque (or a portion thereof) is generated by providing an additional stabilizing braking force to the wheels 230a and/or 230d using the non-regenerative brakes 234a and 234d.

Accordingly, embodiments of the invention provide methods and systems for simultaneously mitigating trailer sway and charging the vehicle's battery. Therefore, vehicle speed can be maintained and oscillation energy can be damped out by storing the energy back to the vehicle's batter(ies). In normal driving conditions (e.g., when vehicle speed is less than a low speed threshold value), the vehicle's battery can be charged most of the time, which causes the battery to be fully charged most of the time. This stored energy can also be used through generators/motors to accelerate the vehicle when the driver is throttling and to dampen trailer oscillation, if necessary. Furthermore, in more extreme trailer oscillation cases, extra stabilizing braking (e.g., extra regenerative braking and/or non-regenerative braking controlled by the ESC module 42) can be used to help stabilize the trailer sway. This is especially useful when the vehicle has low battery power and a high velocity. In addition, all of the stabilization is performed automatically by the stabilization system 40, which means that the driver is less disturbed while maneuvering the vehicle.

Various features and advantages of the invention are set forth in the following claims.

What is claimed is:

1. A system for stabilizing a hybrid electric vehicle having a plurality of wheels and towing a trailer, the system comprising:
   a regenerative braking system for braking at least one wheel of the hybrid electric vehicle;
   a non-regenerative braking system for braking at least one wheel of the hybrid electric vehicle; and
   a stabilization processing system coupled to the regenerative braking system and the non-regenerative braking system, the stabilization system
      determines a direction of rotation and a speed of the hybrid electric vehicle,
      compares the speed of the hybrid electric vehicle to a predetermined low speed threshold value and a predetermined high speed threshold value,
      instructs the regenerative braking system to brake at least one wheel included in the hybrid electric vehicle when the speed is less than or equal to the predetermined low speed threshold value, and
      instructs the regenerative braking system to brake at least one wheel included on a side of the hybrid electric vehicle opposite the direction of rotation and at least one of regenerative braking system and the non-regenerative braking system to provide an extra stabilizing braking torque to at least one wheel included on a side of the hybrid electric vehicle opposite the direction of rotation when the speed is greater than the predetermined high speed threshold value.

2. The system of claim 1, wherein the stabilization system instructs the regenerative braking system and the non-regenerative braking system to brake at least one wheel included on a side of the hybrid electric vehicle opposite the direction of rotation when the speed of the hybrid electric vehicle is greater than the predetermined low speed threshold value but not greater than the predetermined high speed threshold value.

3. The system of claim 2, wherein the stabilization system instructs the regenerative braking system and the non-regenerative braking system not to brake at least one wheel included on a side of the hybrid electric vehicle corresponding to the direction of rotation when the speed of the hybrid electric vehicle is greater than the predetermined high speed threshold value.

4. The system of claim 1, further comprising a driving system for driving at least one wheel of the hybrid electric vehicle.

5. The system of claim 4, wherein the stabilization system instructs the driving system to drive at least one wheel included on a side of vehicle corresponding to the direction of rotation and instructs the regenerative braking system to brake at least one wheel included on a side of the hybrid electric vehicle opposite the direction of rotation when the speed of the hybrid electric vehicle is greater than the predetermined low speed threshold value but not greater than the predetermined high speed threshold value.

6. The system of claim 5, wherein the stabilization system instructs the driving system to drive at least one wheel included on a side of vehicle corresponding to the direction of rotation when the speed of the hybrid electric vehicle is greater than the low speed predetermined threshold value but not greater than the predetermined high speed threshold value.

7. The system of claim 1, wherein the predetermined low speed threshold value is approximately 110 to 125 kilometers per hour.

8. The system of claim 1, wherein the predetermined low speed threshold value is approximately 55 kilometers per hour.

9. The system of claim 1, wherein the predetermined high speed threshold value is approximately 10 kilometers per hour more than the low speed threshold value.

10. A method for stabilizing a hybrid electric vehicle having a plurality of wheels and towing a trailer, the method comprising:
    determining a speed of the hybrid electric vehicle;
    determining a direction of rotation of the hybrid electric vehicle;
    comparing the speed of the hybrid electric vehicle to a predetermined low speed threshold value and a predetermined high speed threshold;
    when the speed of the hybrid electric vehicle is less than the predetermined low speed threshold value, instructing a regenerative braking system to brake at least one wheel included in the hybrid electric vehicle; and
    when the speed of the hybrid electric vehicle is greater than the predetermined high speed threshold value, instructing the regenerative braking system to brake at least one wheel included on a side of the hybrid electric vehicle opposite the direction of rotation and instructing at least one of the regenerative braking system and a non-regenerative braking system to provide an extra stabilizing braking torque to at least one wheel included on a side of the hybrid electric vehicle opposite the direction of rotation.

11. The method of claim 10, further comprising, when the speed of the hybrid electric vehicle is greater than the predetermined low speed threshold value but not greater than the predetermined high speed threshold value, instructing the regenerative braking system and the non-regenerative braking system to brake at least one wheel included on a side of the hybrid electric vehicle opposite the direction of rotation.

12. The method of claim 11, further comprising, when the speed of the hybrid electric vehicle is greater than the predetermined high speed threshold value, instructing the regenerative braking system and the non-regenerative braking system not to brake at least one wheel included on a side of the hybrid electric vehicle corresponding to the direction of rotation.

13. The method of claim 10, further comprising, when the speed of the hybrid electric vehicle is greater than the predetermined low speed threshold value but not greater than the predetermined high speed threshold value, instructing a driving system to drive at least one wheel included on a side of hybrid electric vehicle corresponding to the direction of rotation and instructing the regenerative braking system to brake at least one wheel included on a side of the hybrid electric vehicle opposite the direction of rotation.

14. The method of claim 13, further comprising, when the speed of the hybrid electric vehicle is greater than the predetermined low speed threshold value but not greater than the predetermined high speed threshold value, instructing the driving system to drive at least one wheel included on a side of vehicle corresponding to the direction of rotation.

15. The method of claim 10, wherein comparing the speed of the hybrid electric vehicle to a predetermined low speed threshold value includes comparing the speed of the hybrid electric vehicle to approximately 110 to 125 kilometers per hour.

16. The method of claim 10, wherein comparing the speed of the hybrid electric vehicle to a predetermined low speed threshold value includes comparing the speed of the hybrid electric vehicle to approximately 55 kilometers per hour.

17. The method of claim 10, wherein comparing the speed of the hybrid electric vehicle to a predetermined high speed threshold value includes comparing the speed of the hybrid electric vehicle to approximately 10 kilometers per hour more than the low speed threshold value.

* * * * *